United States Patent [19]

Bagwe

[11] 3,889,194

[45] June 10, 1975

[54] TELEVISION TUNER TO REDUCE HARMONIC RADIATION INTERFERENCE

[75] Inventor: Suhas Prataprao Bagwe, Forest Park, Ill.

[73] Assignee: Admiral Corporation, Chicago, Ill.

[22] Filed: Oct. 2, 1972

[21] Appl. No.: 294,101

[52] U.S. Cl. .................................. 325/436; 325/439

[51] Int. Cl. ............................................ H04b 1/26

[58] Field of Search ........... 325/436, 439, 453, 473; 178/DIG. 15; 328/162, 165; 331/105, 182

[56] References Cited

UNITED STATES PATENTS 2,825,804 3/1958 Rug .................................... 325/439

3,416,086 10/1968 Carlson .............................. 325/436

*Primary Examiner*—Benedict V. Safourek

[57] ABSTRACT

A color television tuner having means for eliminating Channel 8 and Channel 6 radiation interference commonly referred to as "tweet". The tuner has means for reducing VHF oscillator injection voltage into the mixer. This means comprises the selective use of a relatively high resistance wire for the oscillator coil associated with the selection of Channels 6 and 8. A typical wire used for this coil is a No. 30 Cupron Wire.

6 Claims, 2 Drawing Figures

TELEVISION TUNER TO REDUCE HARMONIC RADIATION INTERFERENCE

BACKGROUND OF THE INVENTION

1. Description of the Prior Art

It has been recognized that interference known as Channel 8 "tweet" can occur in some receivers. This interference apparently is a result of the beating of the Channel 8 oscillator frequency of 227 MC with a 4th harmonic of the IF frequency which is 183 MC. When these two frequencies are mixed they develop a beat frequency of 44 MC. This beat frequency falls directly in the middle of the video IF pass band. This difference frequency passes through the IF and beats with incoming signal frequencies creating interference in the picture. Efforts have been made in design to suppress these harmonics before they reach the video amplifier or before they start getting radiated into the antenna terminals. Proper shielding techniques, lead dressing and RF chokes have been used for this purpose. Even with all of these precautions, however, Channel 8 "tweet" can still occur.

2. Field of the Invention

The field of art to which this invention pertains is tuners for color television receivers, and in particular, to tuners having means for eliminating beat frequencies which interfere with Channel 8 reception.

SUMMARY OF THE INVENTION

It is an important feature of the present invention to provide an improved color television receiver tuner.

It is another feature of the present invention to provide a tuner for eliminating Channel 8 tweet.

It is a principal object of the present invention to provide a tuner for a color television receiver having means for reducing the oscillator injection voltage for the purpose of eliminating radiation interference.

It is another object of the present invention to provide a tuner for a color television receiver having a Channel 8 oscillator coil which is formed of a wire having a relatively higher resistance than wire forming the other coils of the tuner.

It is also an object of the present invention to provide a tuner for a color television receiver having a Channel 8 oscillator coil which is formed of the equivalent of a No. 30 Cupron wire.

It is a further object of the present invention to provide a tuner for a color television receiver having means for reducing the injection voltage at Channel 8 frequencies by increasing the resistance of the oscillator coil without diminishing the video response of Channel 8.

These and other objects, features and advantages of the present invention will be understood in greater detail from the following description and the associated drawing wherein reference numerals are utilized to designate a preferred embodiment.

DESCRIPTION OF THE PREFERRED EMBODIMENT

When a color television receiver is tuned to Channel 8, the oscillator in the tuner is running at the Channel 8 oscillator frequency of 227 MC. This energy is radiated from the tuner to the receiver chassis. Also, some part of the oscillator energy is coupled to the chassis through the leads connected from the chassis to the tuner unit. The video detector diode creates 4th harmonic frequencies of the IF, namely frequencies in the order of 183 MC. When the 183 MC signal beats with the oscillator frequency of 227 MC, a difference frequency of 44 MC is developed. This difference frequency falls in the middle of the video IF pass band which generally occurs between 42 and 46 MC. The difference frequency of 44 MC therefore passes quite readily through the IF pass band and beats with the incoming video signal frequencies thereby creating a beat or interference in the resulting picture.

The presence of beat in Channel 8 and also in Channel 6 has been known, and attempts have been made by those skilled in the art to reduce the beat by shielding techniques principally. By the use of shielding, lead dressings and RF chokes, a reduction in this beat frequency has been accomplished, however, in spite of the shielding, beat frequency can often be seen in the picture. The present invention however deals with a tuner which has means for eliminating the presence of visual beat in the picture during Channel 8 or Channel 6 reception. It should be noted that herein reference to Channel 8 could equally well be reference to Channel 6 for similar reasons.

It was discovered by way of the present invention that the beat frequency in the picture could be eliminated by increasing the resistance of the oscillator coil associated with the Channel 8 tuner strip. By testing the tuner with different resistance wire for each oscillator coil, an optimum condition was obtained when a No. 30 Cupron wire was used. Not only was the beat interference eliminated from the picture, but this was accomplished without interference or degradation in the oscillator frequency stability or in the quality of the receiver performance in any other respect.

Figure 1:
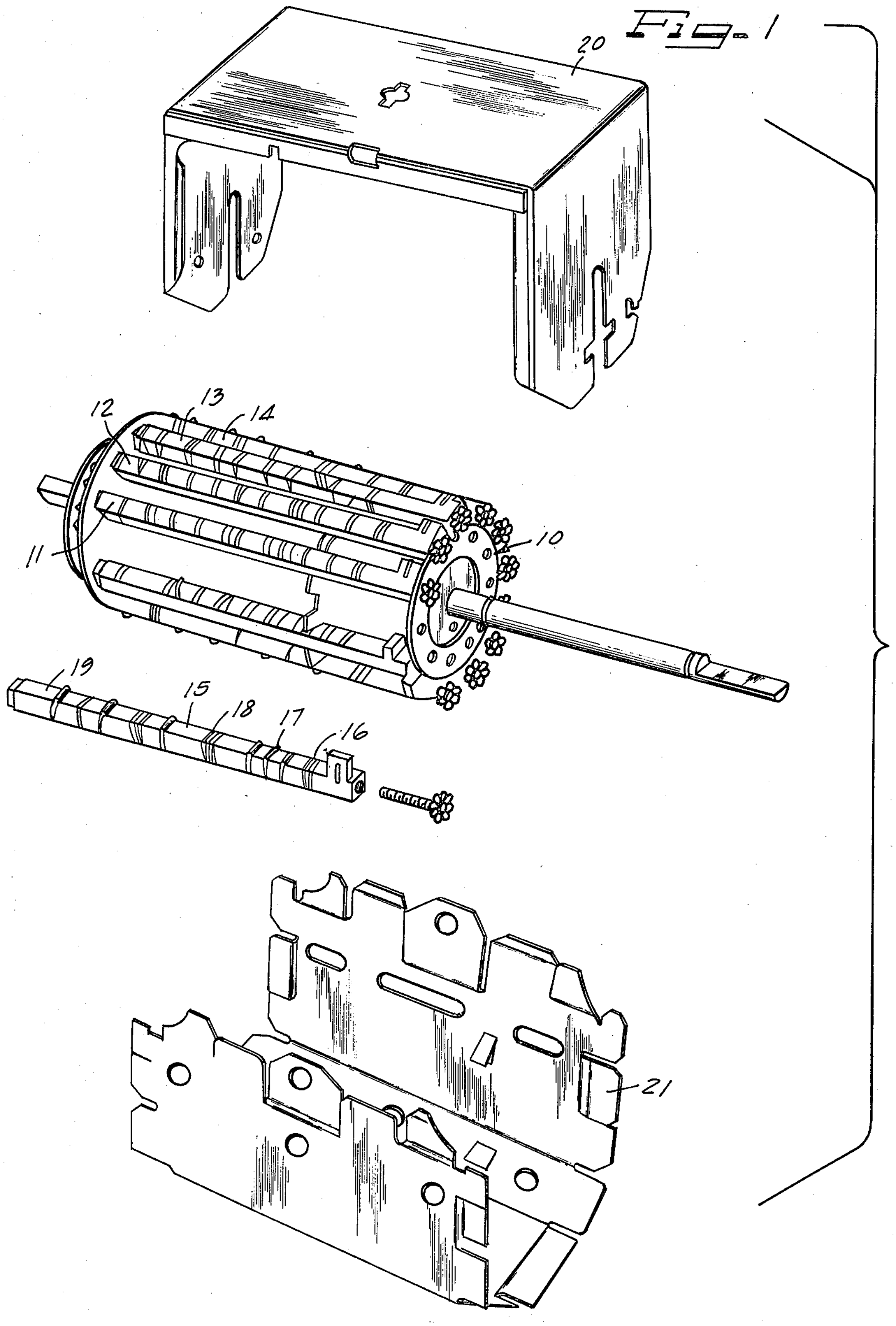
FIG. 1 shows an exploded view of a color television tuner mechanism according to the present invention.

Referring to the drawings in greater detail, FIG. 1 shows an exploded view of the color television tuner according to the present invention. In FIG. 1, a turret 10 is shown as including a plurality of tuner strips such as the strips 11, 12, 13 and 14. One of the strips 15 is shown removed from the turret 10 for clarity. The strip, essentially, consists of a plurality of coils such as the coils 16, 17 and 18 wound on a supporting member 19. The supporting member 19 is then coupled to the turret as shown.

The turret is then mounted in a housing which includes an upper portion 20 and a lower portion 21. By rotating the turret in a well understood manner, respective ones of the strips are moved into position in a tuner circuit such as that shown in FIG. 2. Each one of the strips corresponds to one of the several VHF channels to be selected.

Figure 2:
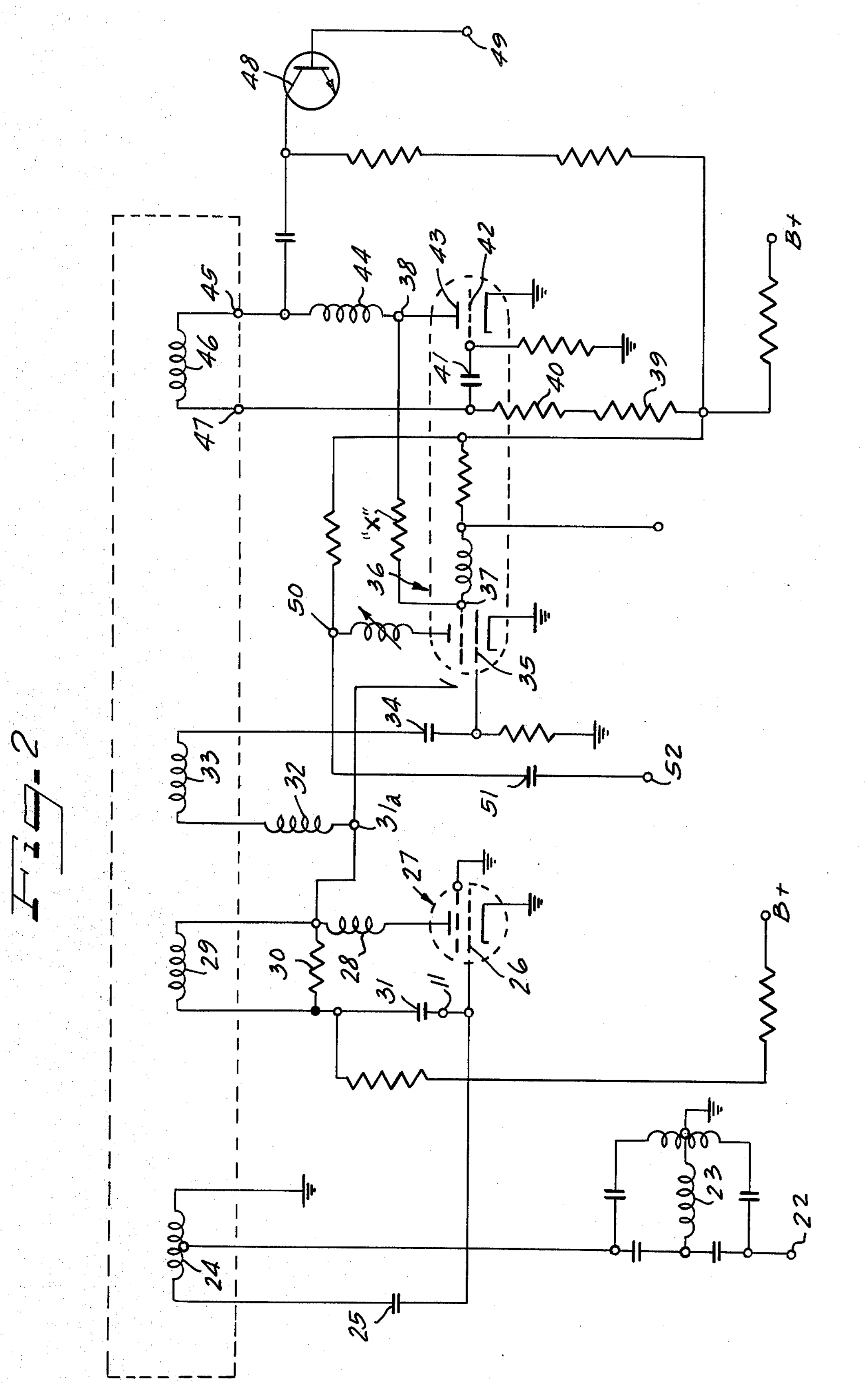
FIG. 2 shows a schematic of the tuner circuitry of the present invention.

In FIG. 2, the tuner circuitry is shown associated with one of the VHF strips. The circuit of FIG. 2 has a VHF antenna input at a terminal 22 which is coupled through a tank circuit indicated generally by the reference numeral 23. A coil 24 is also part of the input RF circuit. An output of the coil 24 is coupled through a capacitor 25 to the first grid 26 of an RF amplifier 27.

The RF amplifier 27 has a load circuit which includes a coil 28, a further coil 29, a resistor 30 and a capacitor 31 which is used to cancel out the feed back capacitance of the plate to grid of the tube 27.

The output of the RF amplifier is coupled to a circuit point 31a which in turn is coupled to coils 32 and 33 and through capacitor 34 to the RF grid 35 of the mixer portion of a mixer-oscillator tube 36.

The mixer portion of the tube 36 has an input at a grid 37 which is coupled from the oscillator portion of the tube at a point 38. The point 38 is coupled through resistor X to the grid 37 of the mixer portion of the tube 36. The grid 42 has a plate 43 associated therewith which is coupled to a coil 44, to a terminal point 45, an oscillator coil 46 and a further terminal point 47. The oscillator coil 46 is the coil which is referred to in the present invention as having been formed of a relatively high resistance wire to reduce the injection voltage which is coupled to the grid of the mixer portion of the tube 36.

A transistor 48 is used as a diode, and an automatic frequency control voltage is coupled to a terminal 49 with the result that the oscillator frequency is corrected in a well understood manner.

The IF output is coupled from a circuit point 50 through a capacitor 51 to an output terminal 52. This is the tuner output which is coupled to an IF input in the receiver chassis.

Despite shielding techniques, in some receivers, picture tweet at the Channel 8 and Channel 6 frequencies was found to occur, and this tweet was eliminated by the selection of high resistance wire for the oscillator coil 46.

The following is a table of various forms of wire which were used for this coil with the resulting oscillator injection voltages given. With the use of each strip going down the table, gradual but definite improvement in tweet was observed. The standard wire used for these coils is the No. 1 strip, identified below as No. 28 copper wire which results in an injection voltage of -1.5 volts. The No. 30 Cupron wire was determined to be the optimum wire to be used for Channel 8 tweet elimination. ,160

The principals of the present invention can be applied to various forms of tuners including solid state tuners, as well as the tube type tuner illustrated in this example.

What I claim is:

1. In a television tuner, a VHF oscillator, a VHF mixer, means for developing an oscillator injection voltage from said VHF oscillator, means for coupling said oscillator injection voltage to said VHF mixer, means for selectively varying the frequency of said VHF mixer, means for selectively varying the frequency of said VHF oscillator for the purpose of selecting one of a plurality of channels, including Channels 6 and 8, and said means for selectively varying the frequency of said VHF oscillator including means for causing a selective reduction in said injection voltage when said VHF oscillator is set for one of Channels 6 and 8 reception, said means for selectively varying the frequency of said VHF oscillator comprising switching means for switching one of the circuit elements of the oscillator out of the oscillator circuit and for switching into the oscillator circuit another circuit element having a different oscillation parameter from said one element, said circuit elements comprising inductance coils, each of said inductance coils being designed to produce specific oscillation frequencies when coupled into said oscillator for the purpose of channel selection and said inductance coil associated with the selection of one of Channels 6 and 8 has a resistance value selected for the purpose of reducing Channel 6 or 8 radiation interference, the resistance value of said inductance coil being substantially higher than the average resistance value of the inductance coils associated with selection of other channels.

2. A television tuner in accordance with claim 1 wherein the resistance value is selected to be of such magnitude to reduce VHF oscillator injection voltage without degrading overall performance.

3. A television tuner in accordance with claim 1 wherein the resistance value of said inductance coil is substantially higher than the average resistance value of the inductance coils associated with selection of other channels.

4. A television tuner comprising: a turret having a plurality of channel selection coils wound thereon, circuit means including a VHF oscillator and a VHF mixer, said circuit means having contacts cooperable with contacts on the turret for coupling a portion of the VHF oscillator to any one of the channel selection coils, the channel selection coil associated with one of Channels 6 and 8 having a substantially higher resistance than the average resistance of like coils associated with the selection of other channels, the value of the resistance of the coil of said one channel is chosen to reduce the injection voltage into said mixer by an amount necessary to eliminate radiation interference without reducing video or fine tuning qualities of the selected channel.

5. A television tuner in accordance with claim 4 wherein the value of the resistance of the coil of said one channel is chosen to reduce the injection voltage into said mixer by an amount necessary to eliminate radiation interference without reducing video or fine tuning qualities of the selected channel.

6. A television tuner in accordance with claim 4 wherein the value of the resistance of said one channel coil is approximately that of No. 30 Cupron Wire.

* * * * *